(12) United States Patent
Forster (10) Patent No.: US 11,593,604 B2
(45) Date of Patent: Feb. 28, 2023

(54) METHOD, SYSTEM, AND APPARATUS FOR BROADBAND AND MULTI-FREQUENCY ANTENNAS FOR RFID DEVICES FORMED BY FOLDING A PLANAR STRUCTURE

(71) Applicant: Avery Dennison Retail Information Services, LLC, Mentor, OH (US)

(72) Inventor: Ian J. Forster, Chelmsford (GB)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 0 days.

(21) Appl. No.: 17/303,405

(22) Filed: May 28, 2021

(65) Prior Publication Data

US 2021/0287063 A1   Sep. 16, 2021

Related U.S. Application Data

(63) Continuation of application No. 16/557,525, filed on Aug. 30, 2019, now Pat. No. 11,055,595.

(60) Provisional application No. 62/724,950, filed on Aug. 30, 2018.

(51) Int. Cl.
*G06K 19/077* (2006.01)

(52) U.S. Cl.
CPC .  *G06K 19/07749* (2013.01); *G06K 19/07718* (2013.01)

(58) Field of Classification Search
None
See application file for complete search history.

(56) References Cited

U.S. PATENT DOCUMENTS

| | | |
|---|---|---|
| 2003/0034891 A1 | 2/2003 | Pedersen |
| 2005/0093678 A1 | 5/2005 | Forster et al. |
| 2006/0152368 A1 | 7/2006 | Turner et al. |
| 2007/0046475 A1 | 5/2007 | Carrender |

(Continued)

FOREIGN PATENT DOCUMENTS

EP   3229180   10/2017

OTHER PUBLICATIONS

International Search Report and Written Opinion dated Dec. 9, 2019 issued in corresponding IA No. PCT/US2019/049138 filed Aug. 30, 2019.

(Continued)

*Primary Examiner* — Kristy A Haupt (57) ABSTRACT

An RFID device is provided with a substrate and a plurality of RFID components associated to the substrate. The substrate is initially provided in a substantially planar configuration, with the RFID components being associated to the substantially planar substrate. After the RFID components have been associated to the substrate, the substrate is folded at least one fold line to give the substrate and resulting RFID device a non-planar structure. All or portions of at least two of the RFID components are associated to portions of the substrate that are present in different planes, which may include portions of the substrate that are oriented in generally parallel planes or at an angle to each other. By such a non-planar, three-dimensional configuration, an RFID device may be provided with enhanced functionality, including increased bandwidth, ability to receive and radiate signals in a plurality of distinct frequency bands, and directivity.

4 Claims, 5 Drawing Sheets

(56) References Cited

U.S. PATENT DOCUMENTS

| | | | |
|---|---|---|---|
| 2007/0145150 A1* | 6/2007 | Barczyk | G06K 19/07749 |
| | | | 235/492 |
| 2007/0182559 A1 | 8/2007 | Lawrence et al. | |
| 2009/0160653 A1 | 6/2009 | Yeh et al. | |
| 2009/0321531 A1 | 12/2009 | Speich | |
| 2010/0230498 A1 | 9/2010 | Atherton | |
| 2011/0253792 A1 | 10/2011 | Tuttle et al. | |
| 2013/0099004 A1* | 4/2013 | Alo | H01Q 7/00 |
| | | | 235/492 |
| 2014/0263655 A1* | 9/2014 | Forster | H01Q 1/2225 |
| | | | 235/492 |

OTHER PUBLICATIONS

International Preliminary Report on Patentability dated Mar. 2, 2021 issued in corresponding IA No. PCT/US2019/049138 filed Aug. 30, 2019.

\* cited by examiner

METHOD, SYSTEM, AND APPARATUS FOR BROADBAND AND MULTI-FREQUENCY ANTENNAS FOR RFID DEVICES FORMED BY FOLDING A PLANAR STRUCTURE

CROSS REFERENCE TO RELATED APPLICATIONS

This application is a continuation of U.S. patent application Ser. No. 16/557,525 filed Aug. 30, 2019, which claims the benefit of U.S. Provisional Patent Application No. 62/724,950 filed Aug. 30, 2018, both of which are incorporated herein by reference in their entireties.

FIELD OF THE DISCLOSURE

The present subject matter relates to the manufacture of radio frequency identification ("RFID") devices. More particularly, the present subject matter relates to the formation of non-planar, three-dimensional RFID devices by folding a planar structure.

DESCRIPTION OF RELATED ART

RFID tags and labels (collectively referred to herein as "devices") are widely used to associate an object with an identification code. RFID devices generally have a combination of antennas and analog and/or digital electronics, which may include, for example, communications electronics, data memory, and control logic. For example, RFID tags are used in conjunction with security locks in cars, for access control to buildings, and for tracking inventory and parcels.

RFID devices are formed in a variety of manners. Typically, RFID devices are formed with a substantially planar or flat structure. For example, RFID devices can be printed on or otherwise applied to a substrate and deployed in a variety of environments, including adhering, coupling, or otherwise fastening the RFID device to an object or item. Depending on the deployment, the RFID device may then be scanned or encoded with desired data or information or provide data or information.

However, planar RFID devices and their associated components may have certain limitations associated with bandwidth, use of multiple bands, and/or directivity.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect or embodiment of the present disclosure, a method of manufacturing an RFID device includes providing a substantially planar substrate and associating a plurality of RFID components to the substrate. The substrate is folded at least one fold line to define a non-planar RFID device In a further aspect or embodiment of the present disclosure, an RFID device includes a substrate, with a plurality of RFID components associated to the substrate. The substrate is folded at least one fold line to define a non-planar structure.

In an additional aspect or embodiment of the present disclosure, a system for manufacturing an RFID device includes an application station and a folding station. The application station is configured to associate a plurality of RFID components to a substantially planar substrate. The folding station is configured to fold the substrate at least one fold line to define a non-planar RFID device.

BRIEF DESCRIPTION OF THE DRAWINGS

Advantages of embodiments of the present disclosure will be apparent from the following detailed description of the exemplary embodiments thereof, which description should be considered in conjunction with the accompanying drawings in which like numerals indicate like elements, in which.

DESCRIPTION OF THE ILLUSTRATED EMBODIMENTS

Aspects of the present disclosure are disclosed in the following description and related drawings directed to specific embodiments of the present disclosure. Alternate embodiments may be devised without departing from the spirit or the scope of the present disclosure. Additionally, well-known elements of exemplary embodiments of the present disclosure will not be described in detail or will be omitted so as not to obscure the relevant details of the present disclosure. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the present disclosure" and "embodiments" do not require that all embodiments within the scope of the present disclosure include the discussed feature, advantage, or mode of operation.

According to an aspect of the present disclosure, and referring generally to the Figures, three-dimensional or non-planar RFID devices and methods of forming such devices, will be shown and described. Such a three-dimensional RFID device may have several advantages over a conventional RFID device, which is substantially flat or planar or two-dimensional. For example, a three-dimensional, non-planar RFID device according to the present disclosure may be provided with a secondary element that extends the bandwidth of the RFID device, which may include extending the bandwidth of a patch antenna from about 10% to about 20% of the operational frequency. Additionally (or alternatively), a three-dimensional, non-planar RFID device according to the present disclosure may be operable over multiple bands of frequencies, receiving and radiating signals in the range of 800 MHz to 1000 MHz, 2400 MHz to 2500 MHz, and 5.6 GHz to 6 GHz, for example. Additionally (or alternatively), a three-dimensional, non-planar RFID device according to the present disclosure may be provided with directivity, with maximum gain being pointed in a defined direction. Indeed, three-dimensional, non-planar RFID devices according to the present disclosure may have improved effectiveness and performance compared to traditional, flat RFID devices.

Figure 1A:
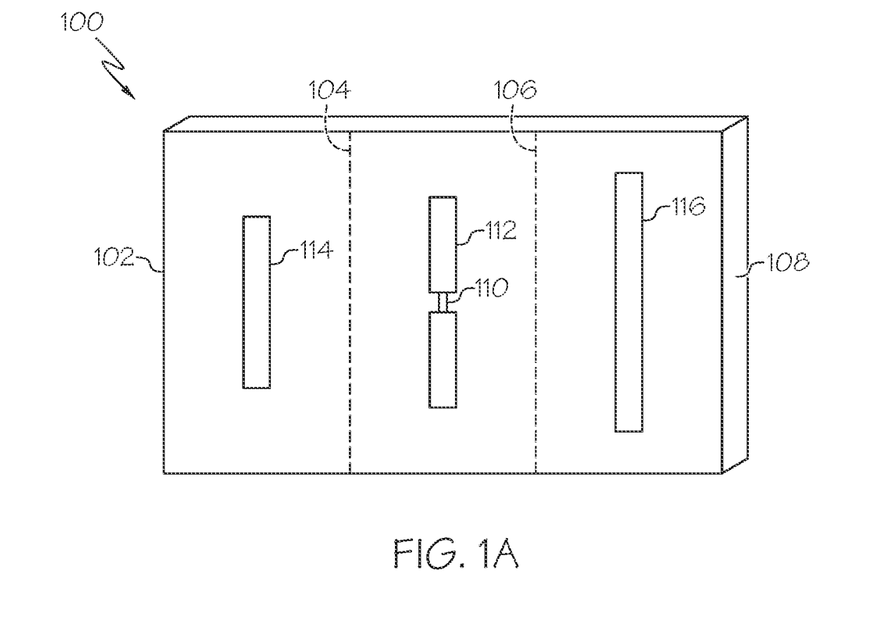
FIG. 1A shows an embodiment of an RFID device according to the present disclosure, in a pre-folding or initial condition.
Figure 1B:
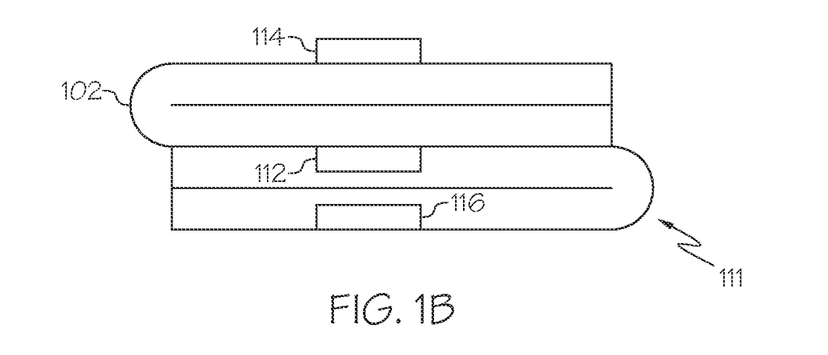
FIG. 1B shows the RFID device of FIG. 1A in a post-folding or final condition.

Referring now to FIGS. 1A and 1B, an exemplary three-dimensional or non-planar RFID device and method of forming the same are shown, with FIG. 1A showing the RFID device in an initial or pre-folding condition (generally identified at 100) and FIG. 1B showing the RFID device in a post-folding or final condition (generally identified at 111). The RFID device includes a substrate 102 with a plurality of RFID components associated thereto. The RFID components may be associated to the substrate 102 according to any suitable approach, which may depend upon the nature of the individual RFID component. For example, it may be appropriate for certain RFID components to be printed onto the substrate 102, while it may be appropriate for other RFID components to be crimped to the substrate 102. It is also within the scope of the present disclosure for an RFID component to not physically contact the substrate 102, but to instead be associated to the substrate 102 by an adhesive layer (or the like) or by being mounted onto another RFID component that is secured to the substrate 102, for example.

The substrate 102 of the RFID device is initially disposed in a substantially flat or planar or two-dimensional orientation (as shown in FIG. 1A). The substrate 102 may be formed from any suitable non-conductive material that is (or may be processed or treated to be) susceptible to folding, such as paper or polyethylene terephthalate ("PET"). The substrate 102 includes at least one defined separation or fold line 104, 106. In the embodiment of FIG. 1A, two substantially parallel fold lines 104 and 106 are shown, but it should be understood that there may be a different number of fold lines (including only one fold line or more than two fold lines) and that a fold line may be variously configured (e.g., curved or otherwise non-linear) without departing from the scope of the present disclosure.

The fold line 104, 106 may be visually and structurally indistinguishable from the other regions of the substrate 102, representing a location at which the substrate 102 is to be folded (as will be described in greater detail herein). However, in other embodiments, the fold line 104, 106 may be visually and/or structurally distinct from other regions of the substrate 102. For example, the fold line 104, 106 may be differently colored than another region of the substrate 102, such as being marked by a colored ink or the like. In another embodiment, the fold line 104, 106 may be scored or narrowed or otherwise weakened compared to other regions of the substrate 102, making it more susceptible to folding (as will be described in greater detail herein).

A layer 108 of foam or other dielectric material (or spacer) may be associated to one side of substrate 102, opposite to the RFID components. As with the substrate 102, it may be advantageous for the layer 108 to be susceptible to folding or deformation, at least in the regions aligned with the fold line(s) 104, 106 of the substrate 102.

Turning now to the RFID components, they may be variously configured without departing from the scope of the present disclosure. Generally speaking, the term "RFID components" refers to an RFID chip 110 and the functional elements of the RFID device that are formed of a conductive material (e.g., aluminum). This may include, without limitation, a drive element or radiating element 112 (e.g., a slot antenna or patch antenna), a director 114, a reflector 116, a ground plane, and conductive leads or traces or interconnects between two or more RFID components.

As described above, the RFID components may be associated to the substrate 102 using any suitable approach. Additionally, the RFID components may be positioned on the substrate 102 in any orientation. In the configuration of FIGS. 1A and 1B, the RFID components 110, 112, 114, and 116 are oriented so as to not cross any of the fold lines 104, 106. In other embodiments, which will be described herein, at least one RFID component may cross a fold line.

With the RFID components associated to the substrate 102, the substrate 102 is folded at the fold line(s) 104, 106 to move it from its initial, planar configuration 100 (FIG. 1A) to its folded or three-dimensional or non-planar configuration 111 (FIG. 1B). FIGS. 1A and 1B show the substrate 102 being folded into a stack having a plurality of (namely three) generally parallel substrate layers, but it should be understood that a stack may have two generally parallel substrate layers or more than three generally parallel substrate layers. Providing an RFID device with RFID components associated with more than three generally parallel substrate layers of a stack may increase bandwidth and/or add operational frequencies to the RFID device, for example. Additionally, other (non-stacked) folded configurations may be employed without departing from the scope of the present disclosure, as will be described in greater detail herein.

The folded configuration 111 of FIG. 1B provides for defined separations between the director 114, the antenna or drive (or radiating) element 112, and the reflector 116, with each RFID component being located in a different plane and associated to a different layer of the stack. The separation between the RFID components may be important to proper operation of the RFID device and be affected by the thickness of the spacer or dielectric layer 108, such that it may be advantageous to employ a spacer or dielectric layer 108 having an appropriate thickness. The folded orientation 111 of FIG. 1B may allow for the direction of maximum gain in a direction along the axis of the RFID device, in a direction from the reflector 116 toward the director 114, though it should be understand that other advantages may be realized with differently configured RFID components.

In one embodiment, the substrate 102 is folded in such a way that it will not tend to deform from the folded configuration 111 to the flat configuration 100. However, if the substrate 102 has a tendency to deform from the folded configuration 111 to the flat configuration 100, it may be advantageous to provide a locking mechanism to retain the substrate 102 in the folded configuration 111. The nature of the locking mechanism may vary without departing from the scope of the present disclosure, but it is preferably selected so as to not interfere with proper operation of the RFID device. In one exemplary embodiment, the locking mechanism may be an adhesive that secures one substrate layer to an adjacent substrate layer. In another exemplary embodiment, the locking mechanism may be a clip or wrap or retainer that entraps the substrate 102 to prevent it from moving away from its folded configuration 111. It is also within the scope of the present disclosure for a plurality of similarly or differently configured locking mechanisms to be incorporated into a single RFID device.

Figure 2A:
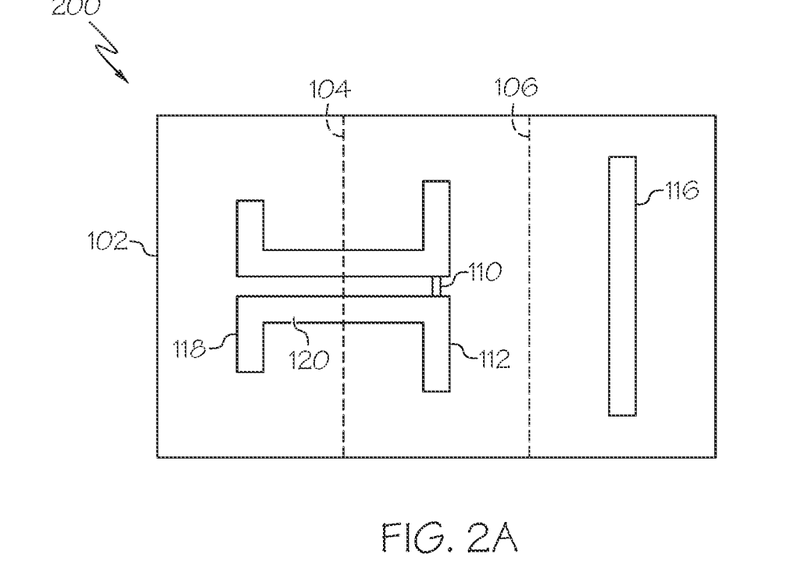
FIG. 2A shows another embodiment of an RFID device according to the present disclosure, in a pre-folding or initial condition.
Figure 2B:
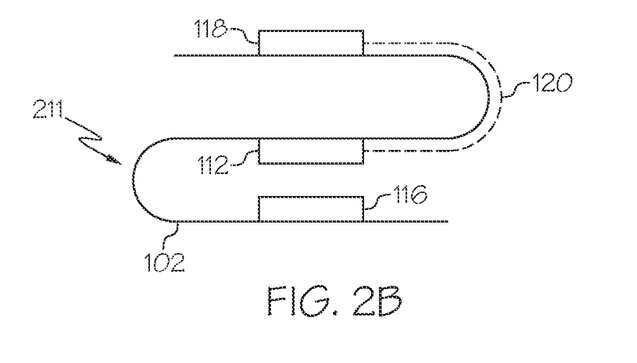
FIG. 2B shows the RFID device of FIG. 2A in a post-folding or final condition.

Referring now to FIGS. 2A and 2B, a variation of the RFID device of FIGS. 1A and 1B is shown. In the exemplary embodiment of FIGS. 2A and 2B, the director 114 is replaced by a second drive or radiating element 118. The drive elements 112 and 118 are connected by an interconnect or conductive lead or trace 120. In contrast to the RFID components of FIGS. 1A and 1B, the interconnect 120 is an RFID component that extends across one of the fold lines 104. Thus, when the substrate 102 is moved from its flat configuration 200 (FIG. 2A) to its folded configuration 211 (FIG. 2B), the interconnect 120 is similarly folded, effectively coupling the RFID chip 110 to drive elements 112 and 118 in different planes.

Due to the interconnect 120 being folded when moving the substrate 102 from its flat configuration 200 to its folded configuration 211, it may be advantageous for the interconnect 120 (or any other RFID component that extends across a fold line) to be configured to be folded, which is shown in FIG. 2B as the interconnect 120 being relatively thin compared to the other RFID components, rendering it more susceptible to being folded. While FIG. 2B shows the interconnect 120 as being relatively thin, it should be understood that an RFID component extending across a fold line may be otherwise configured to render it more susceptible to being folded (e.g., by forming it of a more flexible material than the material used to form other RFID components). It should also be understood that an RFID component extending across a fold line is not limited to an interconnect between two drive elements (as in FIGS. 2A and 2B), but may be some other RFID component.

Figure 3:
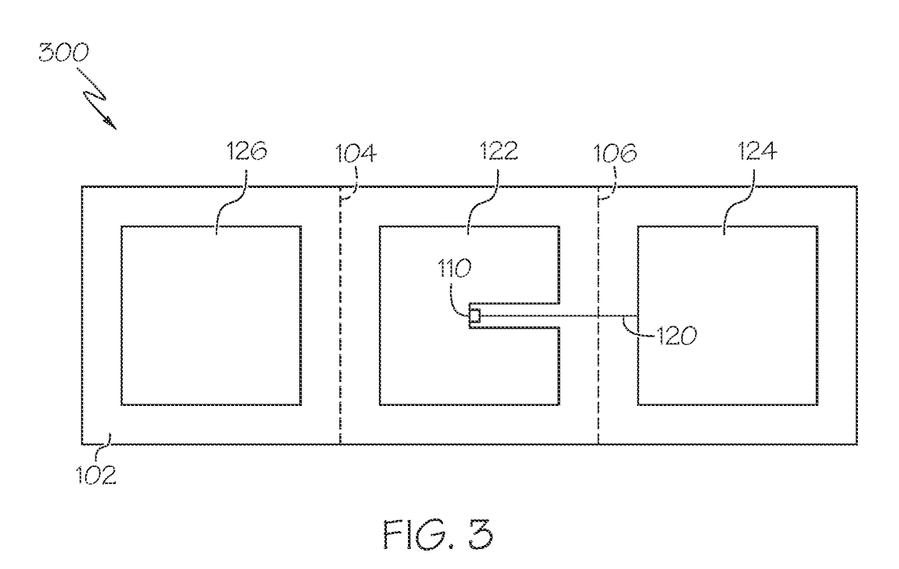
FIG. 3 shows yet another embodiment of an RFID device according to the present disclosure, in a pre-folding or initial condition.

FIG. 3 illustrates another embodiment of a three-dimensional RFID device according to the present disclosure. While FIG. 3 shows the RFID device in a flat or planar configuration 300, it should be understood that it is configured to be folded at one or more fold lines in order to define a non-planar, three-dimensional structure, such as the structures of FIGS. 1B and 2B. In the embodiment of FIG. 3, the RFID device includes a plurality of RFID components associated to a substrate 102 such that, when the substrate 102 is folded at fold lines 104 and 106, a patch antenna is formed. More particularly, the patch antenna may be formed from a half wave patch such that the length of edges of a driven patch 122 equal one half wavelength in the dielectric environment present. A conductor or interconnect 120 extends across a fold line 106, connecting the RFID chip 110 (around a fold, as in FIG. 2A) to a ground plane 124. A secondary or parasitic patch antenna 126 is spaced from the main patch antenna 122 by a fold line 104 and configured to be positioned in front of the main patch antenna 122 when the RFID device is in its folded configuration. This orientation of the driven patch antenna 122 and the secondary patch antenna 126 can provide for extended bandwidth of the RFID device and/or provide multi-frequency capabilities and operation.

Figure 4:
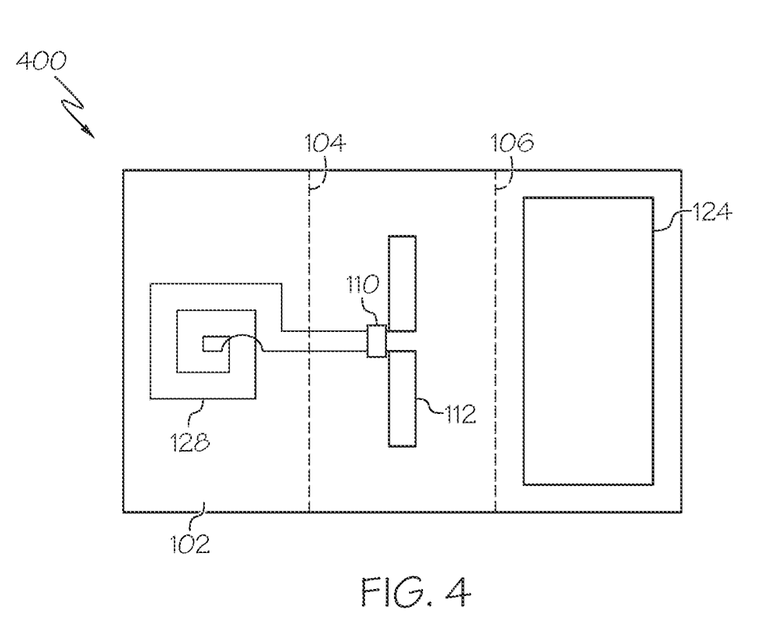
FIG. 4 shows another embodiment of an RFID device according to the present disclosure, in a pre-folding or initial condition.

FIG. 4 illustrates another embodiment of an RFID device according to an aspect of the present disclosure. While FIG. 4 shows the RFID device in a flat or planar configuration 400, it should be understood that it is configured to be folded at one or more fold lines in order to define a non-planar, three-dimensional structure, such as the structures of FIGS. 1B and 2B. In the embodiment of FIG. 4, a pair of drive elements are configured as a dipole-form antenna 112 with a reflector and a coil antenna 128 (for example an HF coil antenna) designed to operate in the region of 13.56 MHz. When this RFID device is folded at the fold lines 104 and 106, the distance between the ground plane 124 and the coil antenna 128 can be increased, which can result in a corresponding increase in the efficiency of the coil antenna 128 through a reduction in eddy current loss.

Figure 5A:
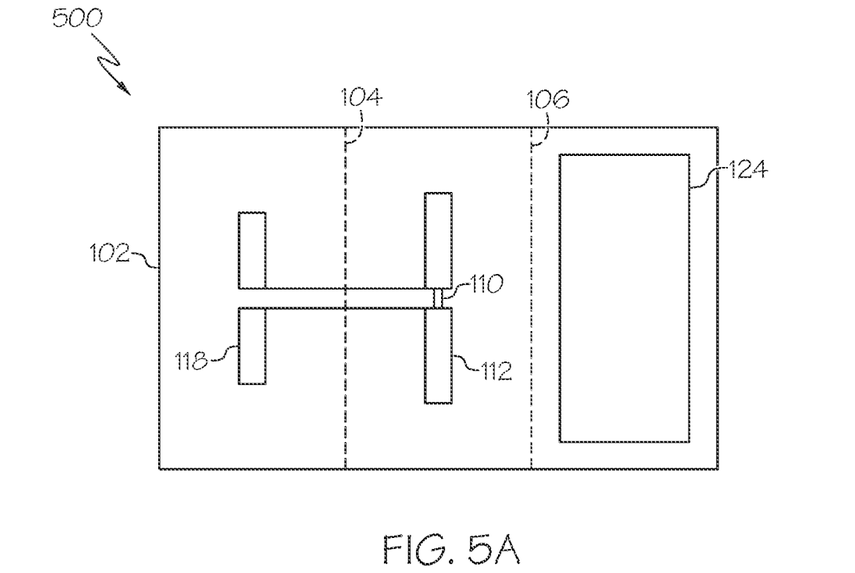
FIG. 5A shows yet another embodiment of an RFID device according to the present disclosure, in a pre-folding or initial condition.

As noted above, RFID devices according to the present disclosure are not limited to any particular folded configuration (e.g., the stacked configuration of FIGS. 1B and 2B), but may be folded into any of a variety of three-dimensional, non-planar configurations. For example, FIG. 5A illustrates an RFID device in a flat or planar configuration 500. The RFID device is folded at fold lines 104 and 106 to define a three-dimensional or non-planar structure, as in the preceding embodiments. However, rather than the substrate 102 being folded so as to define a stack with generally parallel substrate surfaces (as in FIGS. 1B and 2B), the substrate 102 is instead folded to orient at least one substrate surface (having at least one RFID component associated thereto) at an angle with respect to another substrate surface (having at least one other RFID component associated thereto).

Figure 5B:
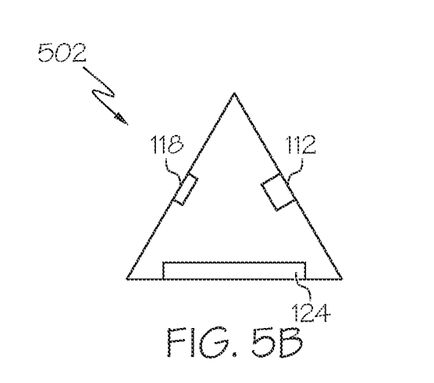
FIGS. 5B and 5C show the RFID device of FIG. 5A in a post-folding or final condition.
Figure 5C:
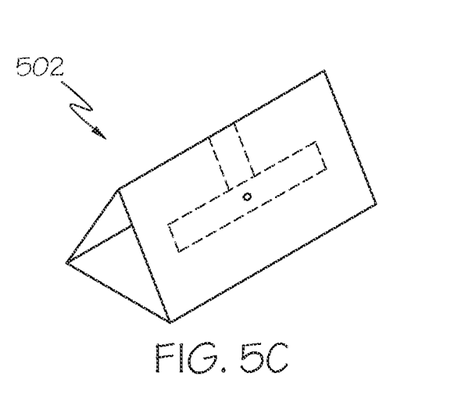

FIGS. 5B and 5C illustrate one possible implementation of this approach, with the substrate 102 being folded at two fold lines 104 and 106 to provide an RFID device having a closed, generally prismatic configuration 502 having a generally triangular cross sectional shape. While FIGS. 5B and 5C show the RFID device with a generally triangular profile, it should be understood that an RFID device according to the present disclosure may be folded into any other three-dimensional shape, such as a cube or cylinder. In such embodiments, larger separations between the antenna elements 112 and 118 and the ground plane 124 may be realized than what may be possible with a foam spacer (as in the embodiment of FIGS. 1A and 1B). Additionally, a closed, generally prismatic configuration in which the RFID components are positioned inwardly of the substrate 102 (as in FIGS. 5B and 5C) may be advantageous to shield the RFID components from the outside environment (using the substrate 102). As in other exemplary embodiments, such elements and folding may be varied to provide enhanced RFID capabilities.

RFID devices according to the present disclosure may be manufactured using any suitable system. In an exemplary embodiment, a system includes an application station configured to associate the various RFID components to the substrate, which may include a layer of conductive material being formed onto the substrate, followed by the conductive material being processed (e.g., being stripped from the substrate or cut using a laser or die) to define one or more of the RFID components. In another embodiment, conductive material may be printed onto the substrate to define one or more RFID components. An RFID chip may be electrically coupled to one or more of the other RFID components after all or some of the other RFID components have been associated to the substrate.

In addition to the application station, the exemplary system further includes a folding station configured to fold the substrate at least one fold line to define a three-dimensional, non-planar RFID device. The nature and configuration of the folding station may vary, depending on the nature of the fold(s) to be imparted to the substrate.

In one embodiment, the substrate may comprise a web of material, with the RFID components of a plurality of RFID devices being associated to the same web of material. In this case, the system may further include a separation station for separating the RFID devices of a web of material from each other (e.g., by cutting the web with a blade or the like). Such a system may be configured to separate the RFID devices before folding any of the devices or may instead be configured to fold some or all of the devices before separating them.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired). Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for manufacturing an RFID device, comprising:
   an application station configured to associate a plurality of RFID components to a substantially planar substrate; and
   a folding station configured to fold the substrate at least one fold line to define a non-planar RFID device, wherein the folding station is configured to fold the substrate at a plurality of fold lines, and
   wherein none of the RFID components extend across said at least one fold line.

2. The system of claim 1, wherein the application station is configured to associate said plurality of RFID components to said substrate with at least one of the RFID components extending across said at least one fold line.

3. The system of claim 1, wherein the folding station is configured to fold the substrate into a non-planar RFID device having a plurality of generally parallel substrate layers, with at least two of the RFID components being associated to different substrate layers.

4. The system of claim 1, wherein the folding station is configured to fold the substrate into a non-planar RFID device including a first substrate surface oriented at an angle with respect to a second substrate surface, with at least one of the RFID components associated to the first substrate surface and at least one of the RFID components associated to the second substrate surface.

* * * * *